United States Patent
Fletcher et al.

(10) Patent No.: US 6,208,253 B1
(45) Date of Patent: Mar. 27, 2001

(54) WIRELESS MONITORING OF TEMPERATURE

(75) Inventors: Richard Fletcher, Cambridge; Neil Gershenfeld, Somerville, both of MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/548,079

(22) Filed: Apr. 12, 2000

(51) Int. Cl.[7] .................................................. G08B 17/00
(52) U.S. Cl. .................. 340/584; 340/572.1; 340/572.4; 340/870.17; 374/100; 374/141; 324/200; 324/201; 324/224
(58) Field of Search .......................... 340/572.1, 572.6, 340/584, 870.17, 10.1; 374/100, 141; 324/200, 201, 224

(56) References Cited

U.S. PATENT DOCUMENTS

| | | | |
|---|---|---|---|
| 3,338,100 | * | 8/1967 | Takami ................................ 374/154 |
| 4,105,971 | * | 8/1978 | Nevalainen ......................... 324/203 |
| 5,392,654 | * | 2/1995 | Boyle .................................. 73/761 |
| 5,982,282 | * | 11/1999 | Ryan, Jr. .......................... 340/572.1 |
| 6,025,725 | * | 2/2000 | Gershenfeld et al. .............. 324/652 |
| 6,067,015 | * | 5/2000 | Lian et al. ........................ 340/572.1 |

* cited by examiner

Primary Examiner—Benjamin C. Lee
(74) Attorney, Agent, or Firm—Testa, Hurwitz & Thibeault LLP

(57) ABSTRACT

Temperature sensing through observable, temperature-dependent effects on an interrogating magnetic field is facilitating by a sensing module having, first, a signal element that interacts with the interrogation field to produce a remotely readable magnetic response; and disposed proximate to the signal element, a temperature-sensitive component. This latter component may include a modulation element having a magnetic permeability varying with temperature in the operating range and/or a bias element comprising a magnet having a Curie temperature in the operating range. The temperature-sensitive component interacts magnetically with the signal element such that the remotely readable magnetic response is indicative of a temperature in the operating range.

19 Claims, 3 Drawing Sheets

WIRELESS MONITORING OF TEMPERATURE

FIELD OF THE INVENTION

The present invention relates to remote sensing of temperature, and in particular to wireless sensing.

BACKGROUND OF THE INVENTION

The need to monitor temperature occurs in a wide variety of automated applications, such as manufacturing and transportation of goods. For example, during various phases of a fabrication process, it may be important for the workpiece to remain within a limited temperature range, while food or medicine may be spoiled during shipment if exposed to temperatures above a particular maximum. While electronic temperature measurement is fast and accurate, traditional systems utilize temperature probes that are physically connected, via wires, to sensing circuitry. It is frequently not feasible or inconvenient to run wires to the desired measuring point.

In recognition of such environmental limitations, wireless temperature-monitoring systems have been developed. These typically involve associating both the temperature probe and measurement circuitry with the monitored items. Also associated with the measurement unit is a radio circuit that broadcasts the sensed temperature for remote reading. Obviously this arrangement involves considerable expense and bulk.

An alternative to these approaches is described in U.S. Pat. No. 6,025,725, which discloses an LC resonator package incorporating an electrically active material that responds to an external condition such as temperature. This response alters the resonant frequency and/or harmonic spectra of the package in a predictable fashion, thereby facilitating quantification of the external condition. While simple and inexpensive, the disclosed approach may encounter difficulties in electrically noisy or conductive environments. The LC resonators tend to operate at relatively high frequencies (>1 MHz), and are therefore easily shielded.

DESCRIPTION OF THE INVENTION

Brief Summary of the Invention

The present invention facilitates temperature sensing through observable, temperature-dependent effects on an interrogating magnetic field. This field is produced by transmitter antenna coils, and is effective within a zone representing the operating range of the sensing device. The interrogating magnetic fields used to operate the devices described herein may be relatively low-frequency (e.g., <100 kHz down to DC); the lower the frequency, the more resistant the signal will be to shielding. Moreover, DC magnetic fields will even penetrate most metals, so conductive environments will not prevent operation if a very low-frequency or DC measurement is employed.

The invention utilizes a "tag" or sensing module having, first, a signal element that interacts with the interrogation field to produce a remotely readable magnetic response; and disposed proximate to the signal element, a temperature-sensitive component. This latter component comprises at least one of (i) a modulation element having a magnetic permeability varying with temperature in the operating range, and (ii) a bias element comprising a magnet having a Curie temperature in the operating range. The temperature-sensitive component interacts magnetically with the signal element such that the remotely readable magnetic response is indicative of a temperature in the operating range. Significantly, this temperature-dependent magnetic response is an intrinsic function of the materials and structure of the tag, and thus requires no electronic circuitry on the tag. This results in significant cost reduction.

Depending on the embodiment, the response may be permanent—that is, the effect of exceeding a threshold temperature may be to irreversibly alter or fix the response of the sensing module to an interrogation field. Such embodiments thereby produce a permanent "heat signature" confirming exposure to the temperature threshold. Alternatively, the effect may be reversible, facilitating re-use of the sensor module (or sensing of temperature transitions from above to below the threshold).

Furthermore, the temperature sensitivity of the module may be abrupt or gradual. Modules exhibiting abrupt transitions are useful in registering threshold crossings, while more gradual transitions facilitate continuous monitoring of temperature within an operating range.

The invention is amenable to implementation not only as a thermometer, but in sensing applications for parameters that can be mapped to temperature; that is, if we can measure the temperature of an object subject to known a temperature-affecting influence, it is possible to determine the magnitude of the influence. For example, the invention may be employed as a bolometer to detect and measure electromagnetic radiation (e.g., infrared or RF), or heating due to strain, friction, or drag force (e.g., in an automobile tire).

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Basic Elements

As noted above, the various embodiments of the invention employ combinations of three components: a signal element, a bias element, and a modulation element.

The signal element may be, for example, a harmonic material or a magnetomechanical material. In the former case, a magnetic wire or strip exhibiting harmonic behavior may be stimulated within an interrogation zone by transmitter antenna coils. The coils generate an alternating magnetic interrogation field, which drives the harmonic element into and out of saturation, thereby disturbing the interrogation field and producing alternating magnetic fields at frequencies that represent harmonics of the interrogation frequency. The harmonics are detected by receiver antenna coils, which may be housed in the same structure as the transmitter coils. Harmonic "tags" are frequently used in security applications, since the appearance of a tagged article within the zone—which may be defined, for example, near the doors of a retail store or library—is readily detected.

Typical harmonic materials (such as amorphous wire or Permalloy) exhibit relatively square hysteresis loops, which result in magnetization "jumps" that are discrete and therefore readily detected. Square hysteresis behavior occurs when the magnetizable material exhibits magnetic anisotropy—i.e., the tendency for magnetization to lie along particular axes. The result is relatively sharp transitions along the hysterisis loop, since magnetization tends to flip rather than assume intermediate directions. Magnetoelastic materials (such as amorphous ribbon or Metglass) exhibit a mechanical resonant frequency dictated primarily by the length of the element and the nature of the material (as well as the effect of any applied magnetic bias). When subjected to an interrogating signal tuned to this resonant frequency, a magnetoelastic element responds with a large signal field that is detected by a receiver. The size of the signal field is partially attributable to an enhanced magnetic permeability of the material at the resonant frequency.

A representative harmonic material is the amorphous, magnetically susceptible wire described in U.S. Pat. No. 5,554,232, the entire disclosure of which is hereby incorporated by reference. Such a wire will have a natural magnetic orientation along its entire length. If the wire is thin—i.e., if the cross-sectional diameter is smaller than the width of a magnetic domain—exposure of the material to a magnetic field of sufficient strength results in magnetization propagating as a domain wall along the length of the wire from one end to the other, flipping or reinforcing the wire's natural magnetic orientation. (A magnetic interrogation field ordinarily has some degree of non-uniformity, so that magnetization propagates along the wire in a single direction as dictated by the field divergence.)

Figure 1:
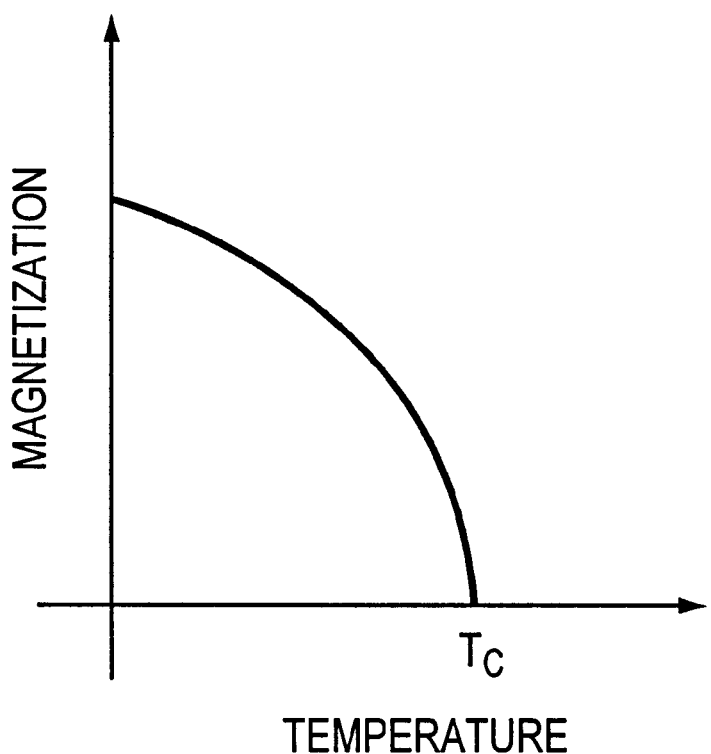
FIG. 1 graphically illustrates the relationship between magnetization and temperature in a representative modulation material.

The modulation element is a material whose magnetic permeability varies with temperature, and which has a Curie temperature ($T_c$) near the operating temperature for a given application. For example, the modulation element may be a "soft" Ni—Fe alloy. Using a DMS vibrating sample magnetometer, the Curie temperature of a 29.5/70.5% Ni—Fe alloy was found to be approximately 70° C. By varying the nickel content over the range 28–80%, it is possible to straightforwardly achieve desired Curie temperatures ranging from 30° C. to 540° C. FIG. 1 is a typical response curve showing the effect of temperature on the magnetization of the bias element.

The bias element is a permanent or semipermanent magnet (e.g., a thin strip of the ARNOKROME 3 magnetic material supplied by Arnold Engineering) that affects the response of the signal element to an applied interrogation field. In one approach, the bias element supplies a magnetization that suppresses the appearance of harmonics when the signal element is subjected to the interrogation field. In the presence of a modulation element below its Curie temperature, however, bias magnetization is shunted away from the signal element (and concentrated in the high-permeability modulation element); as a result, harmonics are detected. At temperatures above the modulation element's Curie temperature, its magnetic permeability decreases, and the magnetic field from the bias element can suppress harmonics.

2. Two-Element Embodiments

Figure 2A:
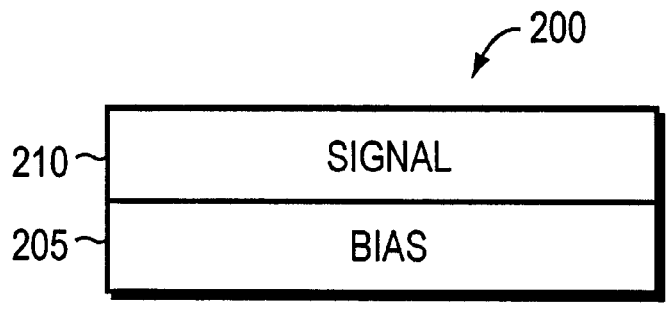
FIGS. 2A, 2B illustrate alternative embodiments of a two-layer sensor.

In a first two-element sensor embodiment 200, illustrated in FIG. 2A, a bias layer 205 is disposed adjacent (and may be affixed) to a signal layer 210. In general, layers 205, 210 are dimensionally coextensive and in the form of a wire, strip or tag as appropriate to the application. Signal layer 210 may be a harmonic material, such as FeNiCoBSi amorphous wire, and in this embodiment, bias layer 205 is temperature-responsive; that is, layer 205 has a Curie temperature in the range of monitoring interest. Below the Curie temperature, bias layer 205 produces a local magnetic field of sufficient magnitude to defeat the interrogation field, preventing the interrogation field from reversing the magnetization of signal layer 210 to produce observable harmonics. As the ambient temperature approaches and exceeds the Curie temperature, the local bias field diminishes sharply, and harmonics are abruptly observed. Accordingly, this embodiment functions as a temperature threshold sensor, with the Curie temperature representing the threshold.

For example, the AC magnetic field experienced by a sensor several inches or more from a typical interrogation coil may be on the order of 25 Oe or less. In this case, it is also possible to use a low-Curie temperature modulation layer (as described below) as a suitable bias element; such a modulation layer can produce a field of approximately 30 Oe at room temperature.

This system is non-reversible; after the Curie temperature has been exceeded, the demagnetization of bias layer 205 is permanent, so harmonics persist even if the sensor 200 is subsequently cooled below the Curie temperature. As a result, the sensor provides a permanent heat record, useful, for example, in identifying food or medicine containers that have been exposed to excessive temperatures during shipping, or confirming that a heat-treated workpiece received sufficient heating during manufacture.

In an alternative implementation, the signal layer 210 in the sensor 200 is a magnetoelastic material. At temperatures well below the Curie temperature ($T<<T_c$) of modulation layer 220, the magnetization of the semi-hard magnetic modulation layer provides a sufficient bias field to enable the sensor 200 to exhibit good resonance characteristics. As the temperature approaches $T_c$, the resonant frequency gradually increases and the observed signal amplitude decreases. When the temperature exceeds $T_c$, the bias layer loses its magnetization and its associated bias field; as a result, the resonance of the signal layer disappears entirely. Once again, this response pattern is irreversible.

Figure 2B:
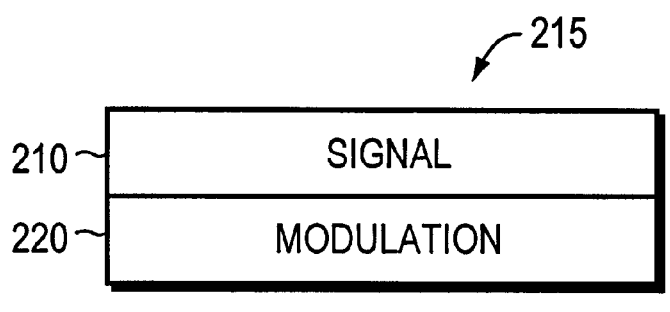

A reversible alternative is illustrated in FIG. 2B. This sensor embodiment 215 comprises a signal layer 210 disposed adjacent to a modulation layer 220. The signal layer 210 may once again be a harmonic material such as FeNiCoBSi amorphous wire. At temperatures below its Curie point, the modulation material has a high permeability, shunting the magnetization of signal layer 210 and thereby attenuating the observed harmonics. The permeability of the modulation material decreases significantly when the temperature is raised above the Curie point, thus enabling the harmonics of the signal layer to be observed. This response to temperature is repeatable. Accordingly, a threshold sensor in accordance with this embodiment is useful, for example, in applications involving repeated temperature cycling.

For example, at 20° C., the 29.5/70.5% Ni—Fe alloy was found to have a measured initial permeability $\mu=43$, whereas at 80° C. the permeability $\mu<5$. This difference results in very weak harmonics at 20° C. and strong harmonics above the Curie temperature of 70° C.

3. Three-Element Embodiments Two functionally equivalent configurations 300, 310 of a three-element sensor are respectively illustrated in FIGS. 3A, 3B. In the configuration 300, a modulation layer 315 is disposed between a bias layer 320 and a signal layer 325. In the configuration 310, the positions of the bias layer 320 and the modulation layer 315 are reversed. As in the two-layer embodiments, the three layers may be intimately joined or may be separate, so long as the layers are in sufficient proximity to interact as described below when subjected to an interrogation field.

Figure 3A:
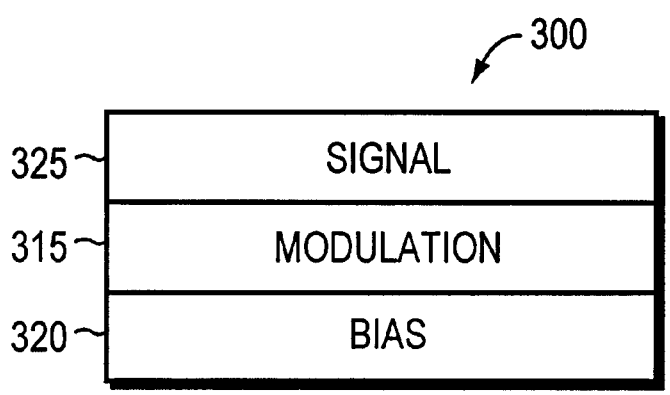
FIGS. 3A, 3B illustrate functionally equivalent alternative implementations of a three-layer sensor.
Figure 3B:
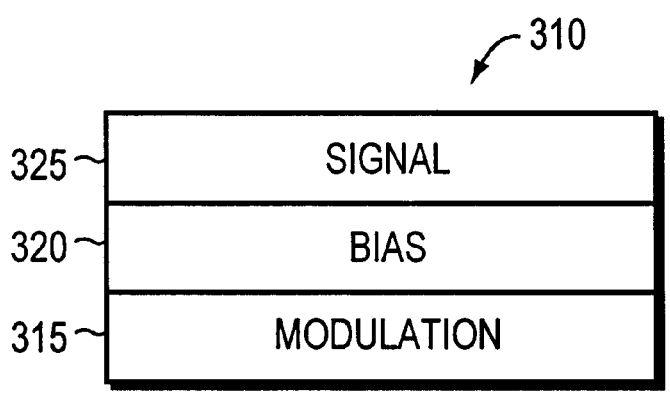

With initial reference to FIG. 3A, a harmonic embodiment utilizes a harmonic signal layer 325, a bias layer 320 having a first Curie temperature $T_{c1}$ and a modulation layer 315 having a second Curie temperature $T_{c2}$, where $T_{c1} >> T_{c2}$; $Tcc_{c1}$ represents an upper limit on device usefulness, and will be well above the upper limit of the operating temperature range. In the absence of modulation layer 315, and at temperatures below $T_{c1}$, bias layer 320 would subject harmonic signal layer 325 to a magnetic field of sufficient magnitude to suppress harmonics. (If the ambient temperature were allowed to approach $T_{c1}$, bias layer 320 would no longer be capable of performing this function.)

Modulation layer 315 serves to moderate the effect of bias layer 320 in a temperature-dependent fashion. Where $T<T_{c2}$, harmonic layer 315 exhibits substantial magnetic permeability and therefore concentrates the flux from bias layer 320, preventing it from affecting signal layer 325 (i.e., by suppressing the effect of the AC interrogation field and thereby eliminating or attenuating harmonics). But when $T \geq T_{c1} < T_{c2}$ the permeability of modulation layer 315 approaches that of the surrounding environment ($\mu \approx 1$), and modulation layer 315 therefore exerts little if any effect on the bias field. As a result, observable harmonics disappear.

Accordingly, this embodiment is different from the sensor 215 shown in FIG. 2B in that the modulation layer exerts its effect on the signal layer not directly, but indirectly via bias layer 320. The sensor 215 may require (or at least accommodate) higher operating temperatures than a harmonic implementation of sensor 300, 310, since the semi-hard magnetic materials commonly used for the bias layer are typically designed for Curie temperatures in the range of 400° C. or greater. Through the proper selection of alloy and materials processing, however, other ranges of Curie temperatures are available.

In the foregoing embodiments, responses to temperature variation occur over a narrow temperature range near the Curie point; as a result, detection is largely limited to determining whether a threshold temperature is exceeded (or, in reversible embodiments, fallen below the threshhold temperature). In the three-layer implementation, the shunting effect of the modulation layer on the bias layer generally occurs more gradually than the demagnetization of the bias layer alone in the two-layer implementation.

Figure 4:
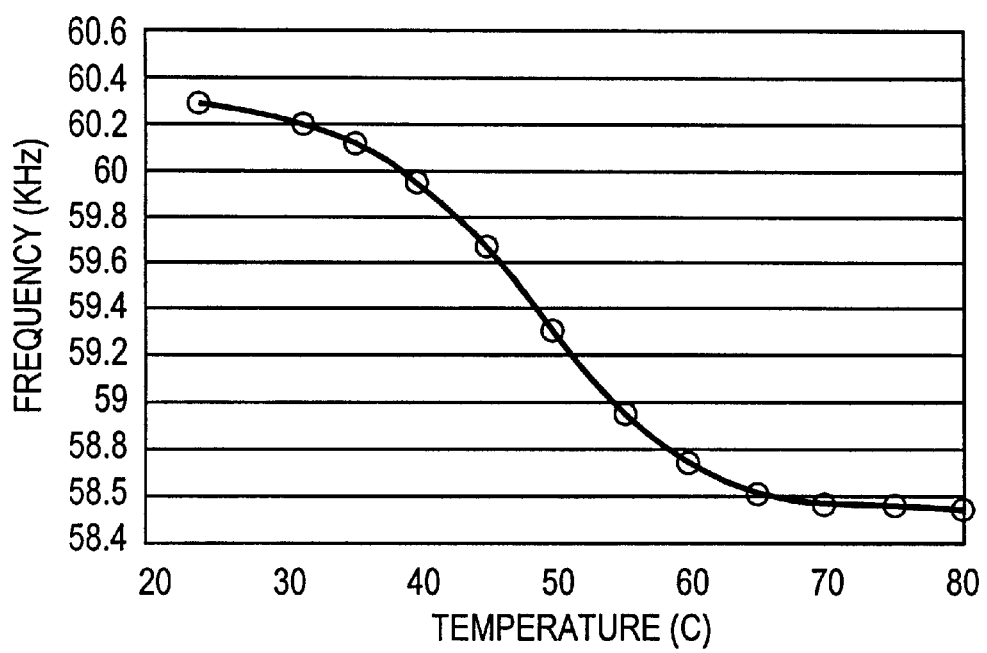
FIG. 4 graphically depicts the relationship between temperature and resonant frequency in a three-layer magnetoelastic temperature sensor.

When signal element 325 is a magnetoelastic strip, its resonant frequency is a function of the DC bias field from bias element 320. Modulation element 315 moderates this field (i.e., the effective field actually experienced by magnetoelastic signal element 325) in a temperature-dependent fashion. At low temperatures $T<T_{c2}$, the magnetic permeability of modulation element 315 is high, so it shunts the bias field from signal layer 325. As the temperature approaches $T_{c2}$, the amount of the bias field reaching signal layer 325 increases, and as a result the resonant frequency shifts down. When the temperature reaches $T_{c2}$, the permeability of modulation layer 315 is at its minimum, and further increases in temperature will not affect the resonant frequency (until $T_{c1}$ is reached, when the bias field itself disappears irreversibly and the resonant frequency rises again). As a result, the temperature may be continuously monitored by tracking the resonant frequency of the sensor. For example, using an amorphous ribbon of $Fe_{35}Ni_{33}Co_{1.9}B_8Si_5$ as the signal layer 325, a 29.5/70.5% Ni—Fe alloy as the modulation layer 315, and an ARNOKROME 3 bias layer 320, the response curve shown in FIG. 4 was observed. Over the temperature range 20° C–70° C., a significant frequency shift of 4% is observed. Given the sharp resonance peak of the magnetoelastic resonator (Q>100), proper mounting of the sensor will facilitate sensing of temperature to within 2° C. using a simple frequency measurement. Of course, it is possible to fabricate sensors operative over other temperature ranges through selection of modulation-layer compositions having appropriate Curie temperatures.

Although a rough measure of continuous temperature change might be possible by measuring the change in the amplitude of the harmonic spectra in the harmonic embodiment, it is preferred to use a magnetoelastic resonant signal layer and track the change in the resonant frequency. Not only is the resonant frequency more immune to external noise and electromagnetic shielding effects, but the measurement of frequency can also be performed with much greater precision relative to an amplitude measurement. Thus, by utilizing a magnetoelastic material for signal layer 325, it is possible to obtain a practical, robust sensor that can report continuous temperature over a relatively wide temperature range.

Characteristics of the various implementations discussed above are summarized in the following table:

|  | 2-element signal layer + low-$T_c$ bias layer | 2-element signal layer + modulation layer | 3-element signal layer + bias layer + modulation layer |
| --- | --- | --- | --- |
| harmonic type (YES/NO threshold sensor) | non-reversible | reversible | reversible |
|  | harmonics appear after heating | harmonics suppressed when cold | harmonics stronger when hot |
| resonant type (continuous readout of temperature) | non-reversible | N/A | reversible |
|  | frequency shift and amplitude change narrow temperature range |  | frequency shift and amplitude change wider temperature range |

It will therefore be seen that the foregoing represents versatile and readily implemented approach to wireless temperature sensing. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A temperature sensor for determining temperature within an operating range, the sensor comprising:
   a. a signal element for producing a remotely readable magnetic response;
   b. disposed proximate to the signal element, a temperature-sensitive component comprising at least one of (i) a modulation element having a magnetic permeability varying with temperature in the operating range, and (ii) a bias element comprising a magnet having a Curie temperature in the operating range, wherein
   c. the temperature-sensitive component interacts magnetically with the signal element whereby the remotely readable magnetic response is indicative of a temperature in the operating range.

2. The sensor of claim 1 wherein the signal element comprises a material producing detectable harmonics in response to an interrogation field and the temperature-sensitive component is a magnet having a Curie temperature in the operating range, the magnet producing, below the Curie temperature, a local magnetic field affecting the signal element and of sufficient magnitude to suppress the harmonics.

3. The sensor of claim 1 wherein the signal element comprises a magnetomechanical material and the temperature-sensitive component is a magnet having a Curie temperature in the operating range, the sensor exhibiting a detectable resonance in response to an interrogation field below the Curie temperature.

4. The sensor of claim 1 wherein the signal element comprises a material producing detectable harmonics in response to an interrogation field and the temperature-sensitive component is a modulation element having a temperature-variable magnetic permeability and a Curie point within the operating range, the modulation element attenuating the harmonics below the Curie point.

5. The sensor of claim 1 wherein the signal element comprises a material producing detectable harmonics in response to an interrogation field and the temperature-sensitive component comprises (i) a modulation element having a variable magnetic permeability and a Curie point within the operating range, the permeability varying with temperature in the operating range, and (ii) a bias element comprising a magnet producing a local magnetic field affecting the signal element and of sufficient magnitude within the operating range to suppress the harmonics, the modulation and bias elements interacting such that, at temperatures within the operating range but above the Curie point, the bias element suppresses the harmonics.

6. The sensor of claim 5 wherein the signal element comprises first and second opposed surfaces, the temperature-sensitive component being disposed adjacent to the first surface.

7. The sensor of claim 6 wherein the modulation element is disposed between the signal element and the bias element.

8. The sensor of claim 6 wherein the bias element is disposed between the signal element and the modulation element.

9. The sensor of claim 1 wherein the signal element comprises a magnetomechanical material and the temperature-sensitive component comprises (i) a modulation element having a magnetic permeability varying with temperature in the operating range, and (ii) a bias element comprising a magnet producing a local magnetic field determining a resonant frequency of the signal element, the permeability of the modulation element shunting a portion of the local magnetic field from the signal element and thereby altering the resonant frequency in a temperature-dependent fashion within the operating range.

10. The sensor of claim 9 wherein the signal element comprises first and second opposed surfaces, the temperature-sensitive component being disposed adjacent to the first surface.

11. The sensor of claim 9 wherein the modulation element is disposed between the signal element and the bias element.

12. The sensor of claim 9 wherein the bias element is disposed between the signal element and the modulation element.

13. A method of sensing temperature within an operating range, the method comprising the steps of:

a. providing a sensor comprising a signal element for producing a remotely readable magnetic response and, disposed proximate to the signal element, a temperature-sensitive component comprising at least one of (i) a modulation element having a magnetic permeability varying with temperature in the operating range, and (ii) a bias element comprising a magnet having a Curie temperature in the operating range;

b. subjecting the sensor to a magnetic interrogation field, the temperature-sensitive component interacting magnetically with the signal element to affect the interrogation field in a manner indicative of a temperature in the operating range; and c. sensing the effect on the interrogation field.

14. The method of claim 13 wherein the signal element comprises a material producing detectable harmonics in response to the interrogation field and the temperature-sensitive component is a magnet having a Curie temperature in the operating range, the magnet producing, below the Curie temperature, a local magnetic field affecting the signal element and of sufficient magnitude to detectably suppress the harmonics.

15. The method of claim 13 wherein the signal element comprises a magnetomechanical material and the temperature-sensitive component is a magnet having a Curie temperature in the operating range, the interrogation field eliciting a detectable resonance below the Curie temperature.

16. The method of claim 13 wherein the signal element comprises a material producing detectable harmonics in response to the interrogation field and the temperature-sensitive component is a modulation element having a temperature-variable magnetic permeability and a Curie point within the operating range, the modulation element detectably attenuating the harmonics below the Curie point.

17. The method of claim 13 wherein the signal element comprises a material producing detectable harmonics in response to the interrogation field and the temperature-sensitive component comprises (i) a modulation element having a variable magnetic permeability and a Curie point within the operating range, the permeability varying with temperature in the operating range, and (ii) a bias element comprising a magnet producing a local magnetic field affecting the signal element and of sufficient magnitude within the operating range to suppress the harmonics, the modulation and bias elements interacting such that, at temperatures within the operating range but above the Curie point, the bias element detectably suppresses the harmonics.

18. The method of claim 13 wherein the signal element comprises a magnetomechanical material and the temperature-sensitive component comprises (i) a modulation element having a magnetic permeability varying with temperature in the operating range, and (ii) a bias element comprising a magnet producing a local magnetic field determining a resonant frequency of the signal element, the permeability of the modulation element shunting a portion of the local magnetic field from the signal element and thereby altering the resonant frequency in a temperature-dependent fashion within the operating range.

19. The method of claim 13 further comprising the step of relating the temperature to a temperature-dependent parameter to determine a magnitude of the parameter.

* * * * *